United States Patent Office 2,965,685
Patented Dec. 20, 1960

2,965,685

POLYMERIZATION INHIBITOR

Dan N. Campbell, Texas City, Tex., assignor to Monsanto Chemical Company, St. Louis, Mo., a corporation of Delaware No Drawing. Filed June 24, 1958, Ser. No. 744,068

8 Claims. (Cl. 260—666.5)

This invention relates to the stabilization of vinyl aromatic compounds and to the stabilized compositions so produced.

It is well known that vinyl aromatic compounds such as styrene, its homologs and analogs, tend to polymerize on standing. In the manufacture of polymers from these monomers, premature polymerization even to a slight extent may render the monomer unfit for use since it may seriously affect the properties of the final polymeric product. Also, since such monomers are subject to auto-polymerization, there is some risk in storing and/or shipping them due to the exothermic nature of the polymerization reaction. For these and other reasons, it is essential to prevent premature polymerization and for this purpose it is common practice to add an inhibiting agent to the monomer.

It is an object of the present invention to provide a new and improved class of polymerization inhibitors for vinyl aromatic compounds.

A further object of the invention is to provide a class of inhibitors which are readily removable from the monomer after which the polymerization can be effected in the usual manner.

Another object is to provide inhibited monomeric vinyl aromatic compounds.

Other objects and advantages will become apparent from the following description of the invention.

According to the invention, the polymerization of vinyl aromatic compounds is effectively inhibited by the incorporation therein of a minor amount of an N,N-dialkylhydroxylamine.

The following examples are given in illustration, but they are not intended to be construed as limiting the scope of the invention in any manner whatsoever. Where parts are mentioned, they are parts by weight.

*Example 1*

The polymerization of styrene containing 0.5 part of N,N-diethylhydroxylamine and styrene containing no inhibitor was studied simultaneously by means of dilatometric experiments. The dilatometer employed was of the stopcock type with a bulb of 25-ml. capacity and a 70-cm. capillary stem of 2.5-mm. bore. The open capillary top was plugged with a small glass bead to eliminate any evaporation of the monomer. In order to insure that it was free of any gas, the styrene employed was distilled under argon and maintained under an argon atmosphere prior to polymerization. The styrene charge was drawn into the dilatometer by suction through a tube extending below the bottom of the degassed styrene. The dilatometer was then placed in a mineral oil bath so that the bulb and 5 cm. of the capillary stem were submerged below the oil level. The oil bath was then heated to raise the temperature of the styrene to 120±0.2° C. Approximately 15 minutes were required for the solution to reach thermal equilibrium upon immersion of the dilatometer in the thermostatically controlled bath.

Initially upon heating, the volume of the styrene in the capillary tube rises to a given level. Thereafter, as polymerization begins and continues, the level of liquid in the capillary tube progressively falls. Thus, the decrease in volume of the liquid in the capillary tube provides a direct measure of the amount of polymerization which is occurring. The following tabulation of data taken on the two samples shows the change in volume as a function of time and demonstrates that the styrene containing N,N-diethylhydroxylamine polymerizes only one-tenth as fast as does the uninhibited styrene.

| Uninhibited Styrene | | | | Styrene Inhibited with N,N-diethylhydroxylamine | | |
|---|---|---|---|---|---|---|
| Time | Dilatometer Height (mm.) | Δh (mm.) | Δt (hr.) | Time | Dilatometer Height (mm.) | Δh (mm.) | Δt (hr.) |
| 11:00 | 437 | | | 11:45 | 438 | | |
| 11:15 | 425 | 12 | 0.25 | 12:45 | 432 | 6 | 1.0 |
| 12:00 | 365 | 72 | 1.0 | 1:30 | 427 | 11 | 1.75 |
| 1:00 | 283 | 154 | 2.0 | 1:45 | 425 | 13 | 2.0 |
| 2:00 | 198 | 239 | 3.0 | 2:45 | 418 | 20 | 3.0 |
| 3:00 | 110 | 327 | 4.0 | 3:45 | 410 | 28 | 4.0 |

*Example 2*

Styrene containing 0.5 part of N,N-di-n-butylhydroxylamine was polymerized in the same dilatometer and under the same conditions described in Example 1. Results obtained which are recorded below demonstrates that the N,N-di-n-butylhydroxylamine is also a powerful inhibitor of polymerization.

[Styrene Inhibited with N,N-di-n-butylhydroxylamine]

| Time | Dilatometer Height (mm.) | Δh (mm.) | Δt (hr.) |
|---|---|---|---|
| 10:45 | 424 | | |
| 11:00 | 423 | 1 | 0.25 |
| 11:15 | 422 | 2 | 0.50 |
| 11:45 | 420 | 4 | 1.0 |
| 1:45 | 403 | 21 | 3.0 |
| 2:45 | 393 | 31 | 4.0 |

The stabilizers or inhibitors of the invention may be either symmetrical or unsymmetrical N,N-dialkylhydroxylamines. In addition to those exemplified, there may be used, for example, N,N-dimethylhydroxylamine, N,N-dipropylhydroxylamine, N,N-diisopropylhydroxylamine, N,N-diamylhydroxylamine, N,N-n-propylmethylhydroxylamine, N,N-ethylmethylhydroxylamine, N,N-butylmethylhydroxylamine, and the like.

The amount of the inhibitor to be used will, of course, vary according to the particular composition and conditions under which it is used. For storage at low temperatures, as little as five parts per million of the N,N-dialkylhydroxylamine per million parts of the monomer is effective. At higher temperatures, and these inhibitors are highly effective at temperatures of 120° C. and higher, larger amounts are required. In general, proportions within the range from 0.001% to about 5% by weight are satisfactory.

When used as storage inhibitors, the N,N-dialkylhydroxylamines do not discolor the vinyl compounds. The monomers containing very low concentrations, in the range of 5 p.p.m. for example, can be polymerized by adding an excess of the catalyst. When larger quantities are used, it is desirable to remove the inhibitor prior to polymerization. This can be done simply, quickly and quantitatively by scrubbing the monomer with water or with dilute acid. Since most of the N,N-dialkylhydroxylamines are soluble in water or dilute acid, the separation of the inhibitor from the monomer is complete and rapid.

The inhibitors are effective with compounds containing ethylenic unsaturation in the side-chain. They are particularly effective with such vinyl aromatic compounds such as styrene, alpha-methylstyrene, ring methylated styrenes and ring chlorinated styrenes, divinylbenzene, ethylvinylbenzene, vinylnaphthalene, and the like.

What is claimed is:

1. A composition comprising a monomeric vinyl aromatic compound containing an amount of an N-N-dialkylhydroxylamine sufficient to inhibit polymerization of said vinyl aromatic compound.

2. A composition comprising a styrene monomer containing an amount of an N,N-dialkylhydroxylamine sufficient to inhibit polymerization of said styrene.

3. A composition comprising styrene containing an amount of N,N-diethylhydroxylamine sufficient to inhibit the polymerization of said styrene.

4. The method of preventing polymerization of a monomeric vinyl aromatic compound which comprises incorporating therein an amount of an N,N-dialkylhydroxylamine sufficient to inhibit polymerization.

5. The method of preventing the polymerization of a styrene monomer which comprises incorporating therein an amount of an N,N-dialkylhydroxylamine sufficient to inhibit polymerization.

6. The method of preventing the polymerization of styrene which comprises incorporating therein an amount of N,N-diethylhydroxylamine sufficient to inhibit polymerization.

7. A composition comprising styrene containing an amount of N,N-di-n-butylhydroxylamine sufficient to inhibit polymerization of said styrene.

8. The method of preventing the polymerization of styrene which comprises incorporating therein an amount of N,N-di-n-butylhydroxylamine sufficient to inhibit polymerization.

References Cited in the file of this patent

UNITED STATES PATENTS

| | | |
|---|---|---|
| 2,318,212 | Foord | May 4, 1943 |
| 2,407,861 | Wolk | Sept. 17, 1946 |
| 2,441,547 | Scherr | May 11, 1948 |
| 2,867,672 | Hemmerich | Jan. 6, 1959 |